United States Patent
Peter et al.

(10) Patent No.: US 6,307,187 B1
(45) Date of Patent: Oct. 23, 2001

(54) OPERATING PROCEDURE RELATED TO A RESISTANCE HEATING ELEMENT AND DEVICE FOR APPLYING SAME

(75) Inventors: Cornelius Peter, Buehl; Kurt Ingrisch, Reutlingen; Thomas Weigold, Sinzheim; Guenther Riehl, Buehlertal, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/319,354
(22) PCT Filed: Oct. 10, 1997
(86) PCT No.: PCT/DE97/02316
  § 371 Date: Aug. 20, 1999
  § 102(e) Date: Aug. 20, 1999
(87) PCT Pub. No.: WO98/25114
  PCT Pub. Date: Jun. 11, 1998

(30) Foreign Application Priority Data

Dec. 3, 1996 (DE) ............................................. 196 50 038

(51) Int. Cl.$^7$ ....................................................... H05B 1/02
(52) U.S. Cl. ........................ 219/497; 219/499; 219/505; 374/1
(58) Field of Search ................................... 219/491, 494, 219/497, 499, 501–505, 508; 307/118; 374/1, 121

(56) References Cited

U.S. PATENT DOCUMENTS 4,881,057   11/1989   Garcia et al. .

FOREIGN PATENT DOCUMENTS

| 38 02 051 | 8/1988 | (DE) . |
| 0 492 670 | 7/1992 | (EP) . |
| 0 743 516 | 11/1996 | (EP) . |
| 2 191 292 | 12/1987 | (GB) . |

OTHER PUBLICATIONS

Patent Abstract of Japan, vol. 96, No. 3, Mar. 29, 1996 & JP 07 306090 A (Murata Mfg Co. Ltd.), Nov. 21, 1995.

*Primary Examiner*—Mark Paschall
(74) *Attorney, Agent, or Firm*—Kenyon & Kenyon

(57) ABSTRACT

A method of operating a resistance heating element and a device for carrying out the method are described. During a first step, the resistance of a resistor of the resistance heating element is determined at a known base temperature. In a second step, the resistance setpoint value is determined as a function of resistance of the resistor at the known base temperature and known temperature coefficients. The resistance heating element is activated by approximately setting the resistance setpoint value in order to heat the resistance heating element to the given setpoint temperature.

14 Claims, 1 Drawing Sheet

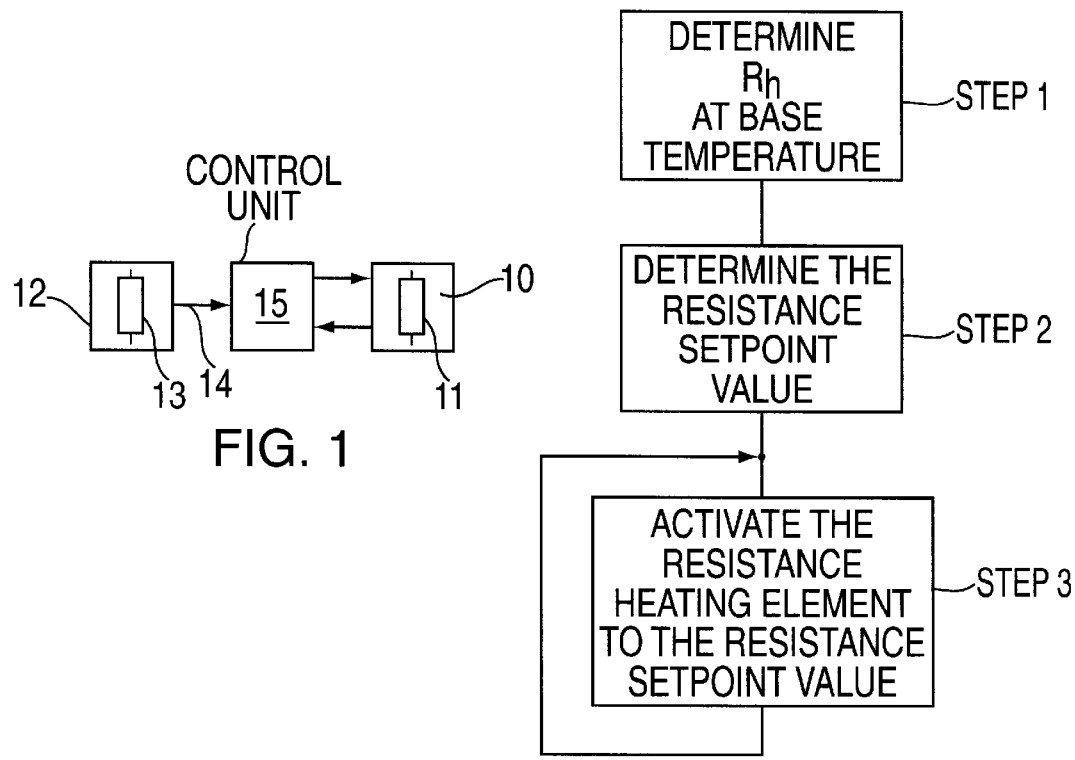
FIG. 1
FIG. 2
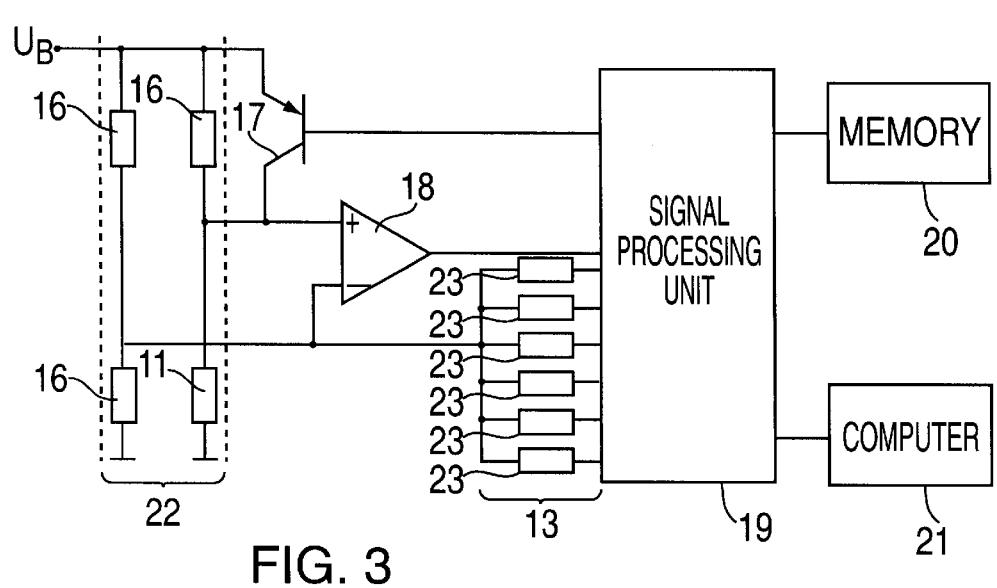
FIG. 3

OPERATING PROCEDURE RELATED TO A RESISTANCE HEATING ELEMENT AND DEVICE FOR APPLYING SAME

FIELD OF THE INVENTION

The present invention relates to a method of operating a resistance heating element and a device for carrying out the method.

BACKGROUND INFORMATION

It is known that the actual temperature required for regulating a resistance heating element can be detected using a separate sensor. These sensor elements can be manufactured with a uniform quality. If the resistor of the resistance heating element is used for temperature detection, it exhibits a substantial spread compared with conventional temperature sensors. An object of the present invention is to provide the parameters required for operating the resistance heating element in a rational manner, allowing automation if required.

SUMMARY

In accordance with an example embodiment of the present invention, a method is provided for operating a resistance heating element. In a first step, a resistance $R_h$ of the resistance heating element is determined at a known base temperature. During a second step, a resistance setpoint value is determined as a function of resistance $R_h$ at the known base temperature and a known temperature coefficient. The resistance heating element is activated by approximately setting this resistance setpoint value. Despite the usually high spread of the values of $R_h$, this resistance $R_h$ is accurately determined under known conditions. Thus the control parameters of the resistance heating element can be specifically adjusted to this resistance $R_h$. The desired setpoint temperature can be attained because the resistance setpoint value is determined as a function of this widely fluctuating resistance $R_h$. This adjustment can also be performed using software; therefore, the method according to the present invention can be easily automated, which contributes to the cost savings, in particular in the case of mass production. The measurement of resistance $R_h$ increases the accuracy of the temperature control.

In an advantageous embodiment, room temperature is used as the base temperature. Thus parameter adjustment is tailored to the known conditions in production. Because of the known temperature coefficient of resistor $R_h$, resistor $R_h$ does not have to be heated.

Using a variable resistance, a signal processing unit determines the resistance $R_h$ at the known base temperature. A resistance setpoint that is determined as a function of resistance $R_h$ and the known temperature coefficient of resistor $R_h$ is set. Thus, the signal processing unit and the variable resistor contribute to setting parameters and to the subsequent operation of the resistance heating element. This saves the cost of separate adjustment devices.

According to an example embodiment, the resistance setpoint value is saved in a memory. The contents of the memory can be subsequently retrieved for control purposes.

One embodiment is distinguished by the fact that resistor $R_h$ is a part of a bridge circuit. Resistance $R_h$ can be easily determined, for example, by bridge balancing.

In another embodiment, the variable resistor is made up of individual resistors connected in parallel, which can be activated individually. Thus, an inexpensive and sufficiently accurate version is achieved.

The method and the device for carrying out the invention are used in a motor vehicle that is equipped with an air quality sensor. The wear on the air quality sensor is reduced by periodic heating.

BRIEF DESCRIPTION OF THE DRAWINGS

FIG. 1 shows a block diagram according to an example embodiment of the present invention.

FIG. 2 shows a flow chart according to an example embodiment of the present invention.

FIG. 3 shows a circuit arrangement according to an example embodiment of the present invention.

DETAILED DESCRIPTION

A resistance setpoint value 12, which is influenced by a variable resistor 13, sends a setpoint signal 14 to an open-/closed-loop control unit 15. Open-/closed-loop control unit 15 sends control signals to a resistance heating element 10, which has a resistor 11 having resistance $R_h$.

During a first step, resistance $R_h$ of resistor 11 is determined at the base temperature. Then, in a second step, resistance setpoint value 12 is determined. In step 3, the resistance heating element is activated according to resistance setpoint value 12. This step is repeated.

A measuring bridge 22 has measuring bridge resistors 16 and resistor $R_h$ 11. The measuring bridge is powered by an operating voltage $U_B$. The diagonal voltage of measuring bridge 22 is sent to a comparator 18. Variable resistor 13, which formed by individual resistors 23, is located between the inverting input of comparator 18 and the inputs/outputs of a signal processing unit 19. A transistor 17 is activated by signal processing unit 19 and supplies resistor $R_h$ 11 with operating voltage $U_B$. A memory 20 and a computer 21 are connected to signal processing unit 19.

Resistance heating element 10 is used, for example, for protecting sensitive electronic components from wear. The porous structures of an air quality sensor installed in a motor vehicle are prevented from being affected by penetration of moisture, in particular, by heating it up periodically. Resistance heating element 10 is heated to a constant absolute temperature of approximately 300° C. A platinum resistor, for example, can be used as resistor $R_h$ 11 of resistance heating element 10. Resistance $R_h$ of resistor 11 can have a substantial spread—manufacturing tolerances as high as ±40% with respect to the desired value should be expected. Resistance $R_h$ of resistor 11 is on the order of magnitude of 50 ohm. In addition, the temperature coefficient of resistor $R_h$ 11 for a certain temperature is also known. If the temperature coefficient of resistor $R_h$ 11 is known for a certain temperature, resistance $R_h$ of resistor 11 at a desired temperature of, for example, 300° C. can be determined using the temperature coefficient.

Resistor $R_h$ 11 is heated to the desired setpoint temperature using open-/closed-loop control unit 15. Setpoint signal 14, which corresponds to the desired setpoint temperature, can be predefined, for example, by a setpoint resistance 12, which can be formed by a variable resistor 13. Voltages or currents that are proportional to resistance setpoint value 12 can also be provided as setpoint signals 14. A potentiometer or a resistor network composed of a plurality of resistors 23 can be used as variable resistor 13. Individual resistors 23 of a resistor network can be switched on or off individually. Thus, the variable resistor is set in discrete steps. An analog or digital setpoint signal 14 can also be provided using controlled current sources or voltage sources.

The parameters required for operating resistance heating element 10 are set in several steps. During a first step, resistance $R_h$ of resistor 11 is determined at a known base temperature. Room temperature or the temperature prevailing at the end of the production process in manufacturing resistance heating element 10 can be used as the base temperature. The procedure for determining resistances is known. For example, if resistor $R_h$ 11 is a part of a measuring bridge 22, the latter can be balanced using a variable resistor 13. Resistance $R_h$ of resistor 11 is then calculated as a function of the resistance of variable resistor 13. If the base temperature fluctuates considerably, it may be convenient to determine it separately.

If resistance $R_h$ of resistor 11 is determined at base temperature, step 2 follows. Using the known temperature coefficients of resistor $R_h$ 11, its theoretical resistance at the desired setpoint temperature is calculated. For this purpose, several resistance-temperature curves can be stored, which have resistance $R_h$ of resistor 11 at base temperature as the parameter. Therefore, the value of resistance $R_h$ of resistor 11 at the setpoint temperature is selected as resistance setpoint value 12. Resistance heating element 10 is activated by open-/closed-loop control unit 15 so that this resistance setpoint value 12 is approximately set. Thus parametrization of open-/closed-loop control unit 15 of resistance heating element 10 is completed. The parameters can be stored, for example, in a memory 20. Steps 1 and 2 can be performed, for example, at the end of the manufacturing process in manufacturing the device for carrying out the method. At this time aids not needed for operating resistance heating element 10 can also be used for calculating resistance setpoint value 12.

The third step usually represents the case where resistance heating element 10 is operated in the control mode of and this step is cyclically repeated. Resistance heating element 10 can be activated according to resistance setpoint value 12 using a transistor 17, for example. Temperature-dependent resistance $R_h$ of resistor 11 is continuously determined and compared to its resistance setpoint value 12. Transistor 17 switches on and off when resistance $R_h$ of resistor 11 drops below or exceeds certain thresholds provided by resistance setpoint value 12. A switch-on period can also be assigned to transistor 17 depending on the previous measuring period. The activation period for the next cycle is changed depending on resistance $R_h$ of resistor 11 in conjunction with resistance setpoint value 12. This third step is executed in normal operation, for example, in a motor vehicle for heating an air quality sensor.

One embodiment of a device for carrying out the method is shown in FIG. 3. Resistor $R_h$ 11, together with measuring bridge resistors 16, is a part of a measuring bridge 22. Measuring bridge resistors 16 have a high resistance compared to that of resistor $R_h$ 11. The diagonal voltage of measuring bridge 22 is sent to a comparator 18. Comparator 18 compares the voltage drop across resistor $R_h$ 11 with the voltage that can be set as a function of the resistance of variable resistor 13.

During the first step, measuring bridge 22 is balanced via variable resistor 13. In the embodiment shown, variable resistor 13 is formed by individual resistors 23 connected in parallel, whose resistances increase exponentially from 6 k ohm to 400 k ohm. Each of the individual resistors 23 can be activated via signal processing unit 19, for example, by grounding the individual resistor 23 to be activated. Depending on the output signal of comparator 18, individual resistors 23 of variable resistor 13 are connected in parallel in any desired manner via the control ports of signal processing unit 19. If measuring bridge 22 is balanced, signal processing unit 19 detects the activated control ports assigned to the known individual resistors 23. This information is forwarded to computer 21 via a serial interface. Computer 21 decodes variable resistor 13 depending on the activation of the control ports. Taking into consideration the resistances of measuring bridge resistors 16, which are also known, resistance $R_h$ of resistor 11 at base temperature can be calculated.

Subsequently, computer 21 determines the resistance setpoint value 12, as explained above. For resistance $R_h$ of resistor 11, calculated for setpoint temperature, the resistance of variable resistor 13 should be selected so that measuring bridge 22 is balanced. Taking measuring bridge resistors 16 into consideration, the resistance of variable resistor 13 and the corresponding activation of the control ports can be determined. This corresponding activation is forwarded to signal processor unit 19, together with resistance setpoint value 12, which in turn can be stored in a memory 20. This memory 20 is, for example, designed as an EPROM. Parameter setting is concluded with the activation of the control ports of signal processing unit 19.

For normal operation according to step 3, computer 21 is no longer needed. During a heating phase, caused when transistor 17 becomes conductive, no diagonal voltage measurement takes place. The transistor is activated for a determined period of time. This is followed by a heating pause, which is used for detecting the diagonal voltage of measuring bridge 22. If measuring bridge 22 is balanced, the setpoint value is equal to the actual value. Comparator 18 confirms that balancing has occurred and communicates this fact to signal processing unit 19. If measuring bridge 22 is not balanced, the duration of the heating phase is modified by signal processing unit 19. The following heating phase is extended or shortened accordingly. Thus adaptive regulation to a setpoint temperature is achieved. A microcontroller is used, for example, as signal processing unit 19.

What is claimed is:

1. A method of operating a resistance heating element, the resistance heating element having a resistance and being heated to a predefined setpoint temperature, the method comprising the steps of:

determining the resistance of the resistance heating element at a predetermined base temperature;

determining a resistance setpoint value as a function of the determined resistance at the predetermined base temperature and a predetermined temperature coefficient using a variable resistance arrangement and a measuring arrangement, the variable resistance arrangement being for coupling to a terminal of the measuring arrangement and the resistance heating element being for coupling to another terminal of the measuring arrangement; and activating the heating element by approximately setting the determined resistance setpoint value to heat the resistance heating element to the predefined setpoint temperature.

2. The method according to claim 1, wherein the predetermined base temperature is room temperature.

3. A device for operating a resistance heating element, the resistance heating element including a resistor and being heated to a predefined setpoint temperature, the device comprising:

a measuring arrangement having a terminal coupled to the resistance heating element;

a variable resistor;

a signal processing unit coupled to the measuring arrangement and determining a resistance of the resistor of the resistance heating element at a predetermined base temperature using the variable resistor, a resistance setpoint value being determined as a function of the determined resistance and a predetermined temperature coefficient, the resistance setpoint value being set using the variable resistor, the variable resistor being coupled at one end to the signal processing unit and at another end to another terminal of the measuring arrangement; and an open-/closed-loop control unit receiving the resistance setpoint value corresponding to the predefined setpoint temperature.

4. The device according to claim 3, further comprising:
a memory device storing the resistance setpoint value.

5. The device according to claim 3, wherein the resistor of the resistance heating element and the measuring arrangement form a measuring bridge.

6. A device for operating a resistance heating element, the resistance heating element including a resistor and being heated to a predefined setpoint temperature, the device comprising:

a variable resistor including a plurality of resistors; and a signal processing unit coupled to the resistance heating element and determining a resistance of the resistor of the resistance heating element at a predetermined base temperature using the variable resistor, a resistance setpoint value being determined as a function of the determined resistance and a predetermined temperature coefficient, the resistance setpoint value being set using the variable resistor, wherein each of the plurality of resistors is activatable by the signal processing unit.

7. The device according to claim 6, wherein the plurality of resistors are coupled in parallel.

8. The device according to claim 5, wherein the measuring arrangement includes a comparator, a diagonal voltage of the measuring bridge being provided to the comparator.

9. The device according to claim 8, wherein a quantity influenced by the resistance of the resistor of the resistance heating element is applied to a first input of the comparator, and a quantity influenced by a resistance of the variable resistor is applied to a second input of the comparator.

10. The device according to claim 3, wherein after activation of the resistance heating element during a time period, a measuring phase follows, a subsequent time period for activating the resistance heating element being determined during the measuring phase as a function of the resistance of the resistor of the resistance heating element.

11. The device according to claim 3, wherein the resistance setpoint value is determined at an end of a production process.

12. The device according to claim 3, wherein the resistance heating element heats an air quality sensor in a motor vehicle.

13. An apparatus for use in operating a resistance heating element, the apparatus comprising:

means for providing a variable resistance;

means for determining a resistance of the resistance heating element at a base temperature;

means for determining a resistance setpoint based on the resistance at the base temperature and a temperature coefficient; and means for setting the resistance setpoint for heating the resistance heating element to a setpoint temperature.

14. An apparatus for use in operating a resistance heating element, the apparatus comprising:

means for providing a variable resistance; and means for determining a base temperature resistance of the resistance heating element and for providing a determined resistance, for determining a resistance setpoint based on the determined resistance and a temperature coefficient, and for setting the resistance setpoint using the means for providing a variable resistance.

\* \* \* \* \*